March 16, 1954     J. C. MILNE     2,671,942
ELECTRICAL DRIVE FOR TEXTILE MACHINES
Filed Jan. 30, 1950     2 Sheets-Sheet 1
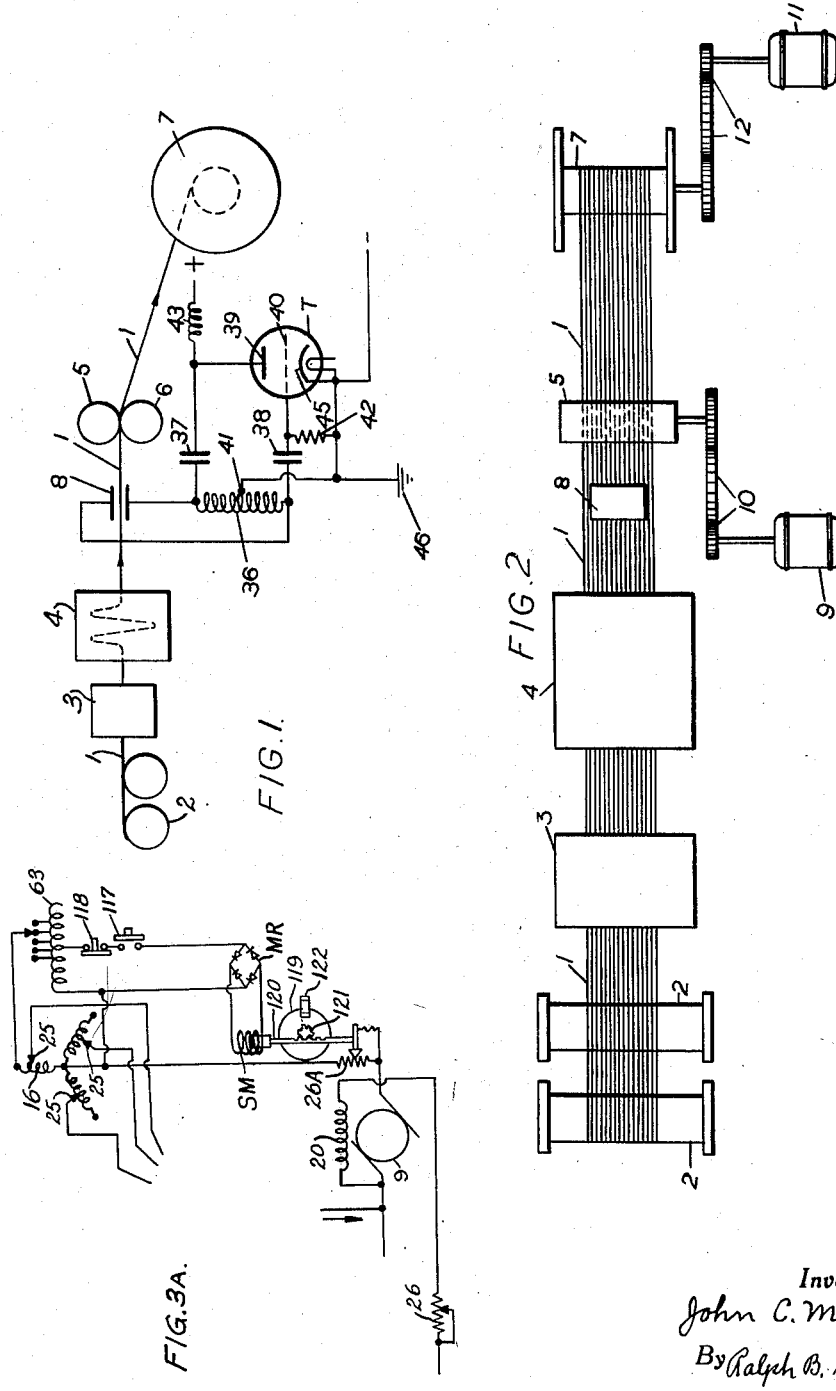
Inventor
John C. Milne
By Ralph B. Stewart
Attorney

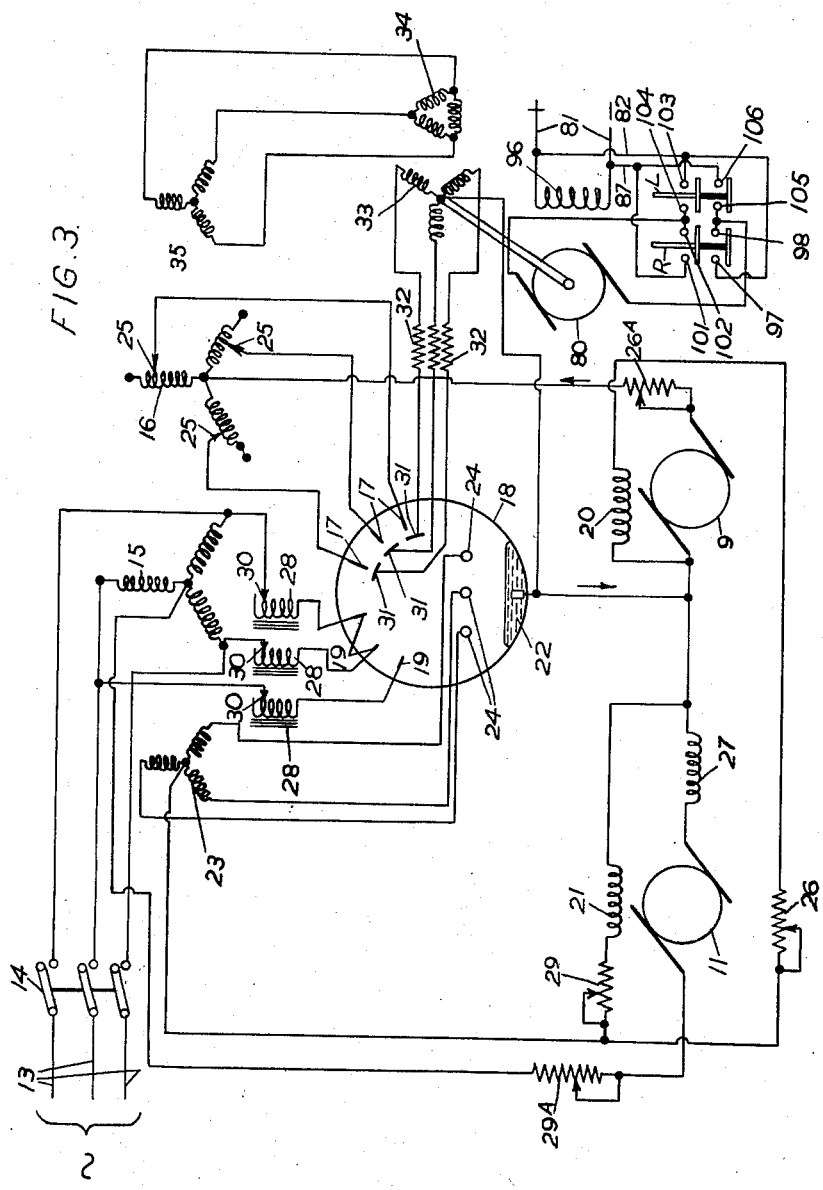

Patented Mar. 16, 1954

2,671,942

UNITED STATES PATENT OFFICE 2,671,942

ELECTRICAL DRIVE FOR TEXTILE MACHINES

John Charles Milne, Wolverhampton, England, assignor to The Electric Construction Company Limited, Wolverhampton, England Application January 30, 1950, Serial No. 141,306

Claims priority, application Great Britain February 9, 1949

7 Claims. (Cl. 28—32)

This invention relates to variable speed electrical driving equipment for textile machinery and broadly to machines in which a web of flexible material or a band of individual threads has to be drawn from one stage of the machine by means of a pair of nipping or pinch rolls and after passing the rolls has to be wound on a warp beam or similar take-up member.

In particular the invention has concern with the driving of sizing machines which have been used in the textile industry for the sizing of warp and like threads for a number of years. It is usual to drive a pair of pinch rolls which draw the threads from a sizing chamber and after the threads have passed between the rolls, they have to be taken up on a beam or on large bobbins. The pinch rolls have to be capable of being driven so as to maintain the threads at a constant linear speed which, however, must be adjustable within wide limits, for example from 2 to 80 yards per minute. Then the take-up beam or bobbin has to be driven so as to maintain the tension in the threads between the pinch rolls and the beam constant irrespective of the diameter of the beam or of the linear speed of the threads. Moreover, the band of threads is sometimes divided and has to be wound on more than one beam or bobbin which may have to be driven at different speeds.

Driving equipment for this purpose hitherto available has not been able to fulfil such conditions so that the versatility of the machine suffers; sufficient speeds of operation have not been provided and the tension in the threads normally depending upon slipping clutches has not been sufficiently flexible.

The object of the present invention is to provide an electrical drive for these and similar machines which overcomes all these difficulties and is entirely automatic regardless of the effective diameter of the beam and involves the use of no slipping clutches or frictional devices.

Broadly, for driving the pinch rolls and the beam or beams, the invention makes use of separate motors which are supplied from an alternating current source through mercury vapour rectifier electrodes in the circuits to which the motor armatures are connected while shunt field windings on the motors are connected between the mercury pool forming the cathode of the rectifier and the neutral point of a transformer winding employed to supply the exciter electrodes of the rectifier.

The pinch roll motor and the beam motor or motors may be supplied through separate rectifiers but it is convenient to connect them in separate branch circuits from the cathode of the rectifier connected through separate regulating devices to the neutral points of supply transformers, which supply the motor armatures through separate anodes of the rectifier bulb; thus as the pinch roll motor requires different regulation from the beam motor, the sources of supply for the two are taken through different transformer windings but if there is more than one beam motor, for example, two beam motors, they may both be supplied from the same transformer winding and through the same electrodes.

The pinch rolls are driven by the roller motor through gearing and, in a particular example, it is necessary to be able to drive the pinch rolls so that the threads are drawn at any constant linear speed between 2 and 80 yards per minute and these speeds are obtained by connecting to different tappings in the winding of the supply transformer. The tappings may be selected by a simple selector switch which is a 3-way switch in the case of a 3-phase supply and the tappings are connected to the appropriate anodes of the rectifier bulb.

The acceleration of the pinch roll motor is important because the threads must not be broken during starting nor must they be allowed to form loops or to balloon between the rollers and the beam. Therefore the acceleration must be readily controlled and capable of adjustment. It is preferred to switch out the armature starting resistance at a predetermined rate and this may be conveniently effected by switching on an electro-magnet by means of the running contactor button so as to draw the contact brush of the starting resistance along that resistance at a definite speed. In one example the time for acceleration can be set at any amount between 5 and 20 seconds. This is arranged by varying the control of a dashpot device which may be in the form of a pot magnet, the exciting current of which can be adjusted.

The speed of the pinch roll motor is thus within a range depending on the transformer tappings employed and an infinitely variable smooth change of speed is obtained by a shunt field regulator.

As already mentioned, the shunt field circuit including the regulator is connected between the cathode of the rectifier and the neutral point of the transformer winding supplying the exciter electrodes of the rectifier.

The beam motor or each of them is supplied from a separate transformer winding and through separate rectifier anodes from the pinch roll motor. The beam motor is a series motor with a limiting shunt field and the characteristics of the motor are such that with the sloping output characteristic of the rectifier supplying it produced by choke coils in the anode connections of the rectifier, the beam motor provides constant horse-power throughout its speed range which is equivalent to constant tension on the threads. As the threads are wound on the beam and therefore, the effective diameter of the beam increases, the motor speed is reduced and the torque provided by the motor increases. One of the main difficulties is to ensure that the thread is kept under tension under all conditions and therefore when the machine is started, the beam motor must accelerate with the pinch roll motor and under no circumstances whatever must the latter accelerate more rapidly than the beam motor; furthermore, during the period of acceleration, too much tension must not be applied to the threads which might thereby be broken. These conditions are provided by adjustable acceleration of the pinch roll motor already described.

The tension in the threads between the pinch rolls and the beam may be regulated by a regulating resistance in the armature circuit of the beam motor and in some cases it is desirable to provide for as many as 21 different amounts of tension.

As an alternative the tension in the threads may be regulated by making the choke coils already mentioned of variable inductance, the same number of steps being provided as mentioned above.

It is obvious that instead of effecting change in speed range of the pinch roll motor by means of changeable tappings on the supply transformer, a similar result may be obtained by providing for grid control on the rectifier bulb; then the grids are connected to the arms of an induction regulator acting as a phase shifting transformer. The supply voltage is regulated by manual adjustment of the rotor of this device.

In the case of a sizing machine or of any equipment in which textile threads or a fabric is subjected to a wet treatment and then dried, it is convenient to arrange for drying to a predetermined degree of moisture content. To that end, the dried material may be passed to a moisture measuring system and the speed of the pinch rolls automatically regulated to maintain the moisture content substantially constant. Thus if the material is insufficiently dried, the speed may be reduced to allow the material to be dried for a larger period and vice-versa.

As an example, the dried threads or fabric may be passed between the plates of a condenser included in an oscillating electric circuit connected to a pair of relays or electromagnetic switches and which functions to energise one of these relays if the material is too moist and the other if the material has been dried too much. These relays are connected to a speed regulator for the pinch roll motor.

In a convenient system, the automatic speed control of the pinch roll motor is effected by grid control of the branch of the mercury vapour rectifier bulb in which the pinch roll motor is connected. An induction regulator is then connected to the grids of that branch of the rectifier bulb and is arranged to be adjustable by a reversible electric motor which adjusts the induction regulator in one direction or the other depending upon the relay which is energised at any time and, therefore, depending upon whether the textile material is too dry or too moist after the drying treatment.

In order that the invention may be clearly understood and readily carried into effect, an example of driving arrangements for carrying a band of warp threads through a sizing machine will now be described by way of example with reference to the accompanying drawings, in which:

Figure 1 is a diagrammatic side elevation of the main parts of the machine and including part of the moisture measuring circuit;

Figure 2 is a plan of the same with the circuit omitted but including the pinch roll motor and the beam motor;

Figure 3 is a circuit diagram of the supply and regulating components for the said two motors;

Figure 3A is a diagram of a modification of Figure 3.

Referring first to Figures 1 and 2, the warp threads 1 are drawn from storage beams 2 through a sizing or processing tank 3 and thence through a drying chamber 4 by means of a pair of pinch rollers 5, 6 and then are taken up by a take-up beam or large bobbin 7. After leaving the drying chamber 4, the threads 1 pass between the plates of a condenser 8. The pinch rolls 5, 6 are driven by an electric motor 9 through gearing 10 and, in fact, they have to be driven to give a constant linear speed of the threads 1 which, however, must be adjustable within wide limits, for example from two to eighty yards per minute. The take-up bobbin 7 is driven by an electric motor 11 through gearing 12 so as to maintain the tension in the threads 1 between the pinch rolls 5, 6 and the bobbin 7 constant irrespective of the diameter at which the threads are wound on to the bobbin 7 or of the linear speed of the threads. Sometimes the band of threads 1 is divided and has to be wound on more than one beam or bobbin 7, each of which bobbins may have to be driven at different speeds so that, in that case, the bobbins are driven by separate motors such as the motor 11.

Referring now to Figure 3, the supply and control system for the pinch roll motor 9 and the beam motor 11 is shown. It will be seen that they are supplied from an alternating current source 13 which is shown as a three-phase main supply connected through a switch 14 to the primary winding 15 of a three-phase transformer. The armature circuit of the pinch roll motor 9 is supplied from a secondary winding 16 of the supply transformer through anodes 17 of a three-phase mercury vapour rectifier bulb 18. The beam motor 11 has its armature supply direct from the primary winding 15 through three further anodes 19 of the mercury vapour rectifier bulb 18. The motors 9 and 11 have respectively shunt field windings 20, 21, each connected between the mercury pool 22 forming the cathode of the rectifier bulb 18 and the neutral point of a further secondary winding 23 of the supply transformer which is provided to supply the excitation electrodes 24 of the mercury vapour rectifier bulb 18.

The anodes 17 and 19 in the armature circuits respectively of the pinch roll motor 9 and the beam motor 11 are shown in Figure 3 as accommodated in the same rectifier bulb 18 so that the armature circuits are branch circuits through the rectifier cathode 22, but it is obvious that the two sets of anodes could be the anodes of two separate rectifiers having their cathodes connected directly together. It will be appreciated that as the pinch roll motor 9 requires different regulation from the beam motor 11, the sources of supply are taken from different transformer windings 16, 15, but if there is to be more than one beam motor such as 11, for example two such motors, they may both be supplied from the same transformer winding 15 and through the same anodes 19, but the circuit regulating devices to be described in detail below, would be separate for the two motors as under some conditions, the two armatures would have to rotate at different speeds.

It has been indicated that the pinch roll motor 9 may have to run over a wide range of speeds, for example, so as to drive the threads 1 at any constant linear speed between two and 80 yards a minute; these speeds are obtained by connecting the anodes 17 to different taps 25 in the transformer winding 16. The taps may be shifted simultaneously by a simple manually-operated selector switch not shown. It is desirable to be able to run the equipment at a crawling speed for a definite short time period to enable the machine to be easily threaded up and, for that purpose, sufficiently low voltage taps are provided on the transformer winding 16. The pinch roll motor 9 is a shunt wound motor with a shunt field regulator 26 for speed variation. However, the motor 9 is arranged for acceleration by means of an adjustable armature resistance 26A. The acceleration of the motor 9 is important because the threads must not be broken during starting nor must they be allowed to form loops or to balloon between the pinch rollers 5, 6 and the take-up bobbin or beam 7. For that reason, the acceleration must be readily controlled and capable of adjustment. The variable rheostat 26A may be adjusted by hand or automatically at a predetermined rate, for example, by means of an electro-magnet shifting its tap under control of a dash pot. Such an arrangement is shown in Figure 3A and will be described in detail below. By this means, the time for acceleration can be set at any amount between 5 and 20 seconds, for which purpose the exciting current of the operating electro-magnet may be adjustable. The running speed of the pinch roll motor 9 is kept constant within a given range by choice of suitable transformer taps 25 and intermediate speeds can be obtained by manual setting of the tap of the field regulator 26.

The beam motor 11 has a series field winding 27 and a shunt winding 21 which provides a limiting field; the latter has a shunt regulator 29. The characteristics of the motor 11 are such that with the sloping output characteristic of the rectifier anodes 19 supplying it produced by choke coils 28 in the connections to the rectifier anodes 19, the beam motor 11 yields constant horse power throughout its speed range and that is equivalent to constant tension on the threads 1. As the threads 1 are taken up on the take-up bobbin 7 and therefore the effective diameter of that bobbin increases, the speed of the motor 11 is reduced and its torque increased. One of the main practical difficulties is to ensure that the threads 1 are kept under tension in all conditions and therefore, when the machine is started, the beam motor 11 must accelerate in step with the pinch roll motor 9 and, in no circumstances whatever, must the motor 9 accelerate more rapidly than the beam motor. Furthermore, during the period of acceleration, too much tension must not be imposed upon the threads 1 since otherwise they may be broken. These conditions are provided by the adjustable acceleration of the pinch roll motor 9 already described.

In order to enable the tension in the threads between the pinch rolls 5, 6 and the take-up bobbin 7 to be regulated, a regulating resistance 29A is connected in the armature circuit of the beam motor 11. It is in some cases desirable to provide a sufficient number of taps in the armature resistance 29A to provide as many as twenty-one degrees of tension in the threads 1. In the embodiment shown in Figure 3, the choke coils 28 are also shown provided with adjustable taps 30. These may be an alternative to the taps of the resistance 29 in which case the taps 30 have the same number of positions as degrees of tension in the threads 1 required. When, as in the embodiment illustrated, both the resistance 29 and the choke coil 28 have taps, however, the number of steps required can be shared between them.

Again as an alternative to or in addition, when effecting change in the speed range of the pinch roll motor 9 by means of adjustable taps 25 on the transformer winding 16, provision may be made for grid control of the rectifier anodes 17. Then the three grids 31 are connected through resistances 32 to the three arms of the rotor 33 of an induction regulator, the primary stator winding of which, 34, is fed by yet another secondary winding 35 of the supply transformer. In Figure 3, the rotor 33 is turned automatically to provide automatic control of the speed of the threads 1 as will be described in detail below, but the rotor 33 may be adjusted manually in the same way as the taps 25 of the transformer winding 16 or in addition to manual adjustment of those taps.

In the system illustrated in the drawings, the speed of the pinch roll motor 9 is made responsive to the amount of moisture in the threads 1 on leaving the drying chamber 4.

As shown in Figure 1, the condenser 8 is connected across a coil 36 which is the tank coil of a Hartley oscillator. The coil 36 in a conventional fashion is connected through condensers 37, 38 to the anode 39 and grid 40 of a three-electrode electron tube T. This tube has an indirectly-heated cathode which is grounded and connected to the mid-tap 41 of the tank coil 36. The usual grid leak resistance 42 is provided.

If the degree of moisture in the threads 1 varies, the tuning of the tank circuit of the oscillator is altered, which changes the anode current taken by the oscillator. This change of current may be amplified and used in any convenient manner to control the speed of the drive. For example, the induction regular rotor 33 (Figure 3), to which are connected the grids 31 of the rectifier 18, may be controlled by motor 80, the armature of which is supplied from source 81 through one or the other of the two relays R and L. Energization of relay R closes contacts 101—102 and 97—98 to rotate the motor 80 in one direction, and energization of relay L closes contacts 103—104 and 105—106 to rotate it in the opposite direction. The operation is such that, if the moisture content of the material is too great the speed of the drive is reduced, and conversely if the moisture content is too small.

An arrangement for the automatic control of resistor 26A is shown in Figure 3A. This arrangement involves an electromagnet SM replacing the manually adjustable tapping on resistor 26A of Figure 3. The same reference numerals as in Figure 3 have been applied to the components common to the two figures. The D. C. excitation for the coil SM is obtained from a rectifier MR energized by a transformer winding 63. The rectifier is supplied from winding 63 through an ordinary start button 117 and a stop button 118. The dash pot illustrated is a conventional eddy-current disc 119 driven from the plunger 120 of the coil SM by rack and pinion gearing 121. The brake magnet embracing the disc 119 is seen at 122.

I claim:

1. Electrical driving equipment for a textile machine comprising a pair of feed rolls for forwarding a length of textile material and a take-up beam for receiving said textile material, said equipment comprising a direct current electric motor in driving connection with said feed rolls, a second direct-current electric motor in driving connection with said take-up beam, at least one vapour rectifier bulb comprising anodes for connection to a polyphase source of alternating current, exciter electrodes and a cathode and a polyphase transformer having a secondary winding connected to supply said exciter electrodes, the armatures of said motors being connected in separate circuits each including certain of said anodes and said motors having shunt field windings connected between a rectifier cathode and the neutral point of said transformer winding.

2. Electrical driving equipment for a textile machine comprising a pair of feed rolls for forwarding a length of textile material and a take-up beam for receiving said textile material, said equipment comprising a direct current electric motor in driving connection with said feed rolls, a second direct current electric motor in driving connection with said take-up beam, a vapour rectifier bulb comprising two sets of anodes, exciter electrodes and a cathode, a polyphase supply transformer comprising a plurality of windings connected respectively to said two sets of anodes and to said exciter electrodes, the armatures of said motors being connected in circuit respectively with said two sets of anodes and said motors having shunt field windings connected between the cathode of said rectifier bulb and the neutral point of said transformer winding connected to said exciter electrodes and separate regulating devices respectively connected in the armature circuits of said motors.

3. Electrical driving equipment according to claim 1, also comprising a power transformer having a tapped secondary winding and switching means for connecting selectively the taps in said secondary winding to said anodes in the armature circuit of said motor for driving said feed rolls.

4. Electrical driving equipment according to claim 1, also comprising a variable starting resistance in the armature circuit of said motor for driving said feed rolls and means for decreasing said resistance at a controlled rate during the starting of said motor.

5. Electrical driving equipment according to claim 1 also comprising a power transformer having a tapped secondary winding, switching means for connecting selectively the taps in said secondary winding to said anodes in the armature circuit of said motor for driving said feed rolls, a variable starting resistance in the armature circuit of said motor for driving said feed rolls and means for decreasing said resistance at a controlled rate during the starting of said motor.

6. Electrical driving equipment according to claim 1, wherein said motor for driving said take-up beam is a series motor with a limiting shunt field and a plurality of adjustable choke coils are connected to said rectifier anodes in the armature circuit of said motor to cause the latter to deliver substantially constant horse-power throughout its speed range.

7. Electrical driving equipment according to claim 6, also comprising a variable resistance connected in the armature circuit of said motor for driving said take-up beam to enable said motor to exert a range of tensions on said textile material wound on said take-up beam.

JOHN CHARLES MILNE.

References Cited in the file of this patent

UNITED STATES PATENTS

| Number | Name | Date |
|---|---|---|
| 1,822,604 | Simons et al. | Sept. 8, 1931 |
| 1,844,699 | Stack | Feb. 9, 1932 |
| 1,926,292 | Kruse | Sept. 12, 1933 |
| 2,142,544 | Whitener | Jan. 3, 1939 |
| 2,263,017 | Sparrow | Nov. 18, 1941 |
| 2,420,399 | New | May 13, 1947 |
| 2,466,446 | Laurie | Apr. 5, 1949 |
| 2,527,208 | Berry et al. | Oct. 24, 1950 |
| 2,532,010 | Courvoisier | Nov. 28, 1950 |
| 2,535,930 | Jones | Dec. 26, 1950 |